May 25, 1926.
J. J. FITZGERALD
GAUGE DEVICE
Filed July 18, 1921
1,585,844
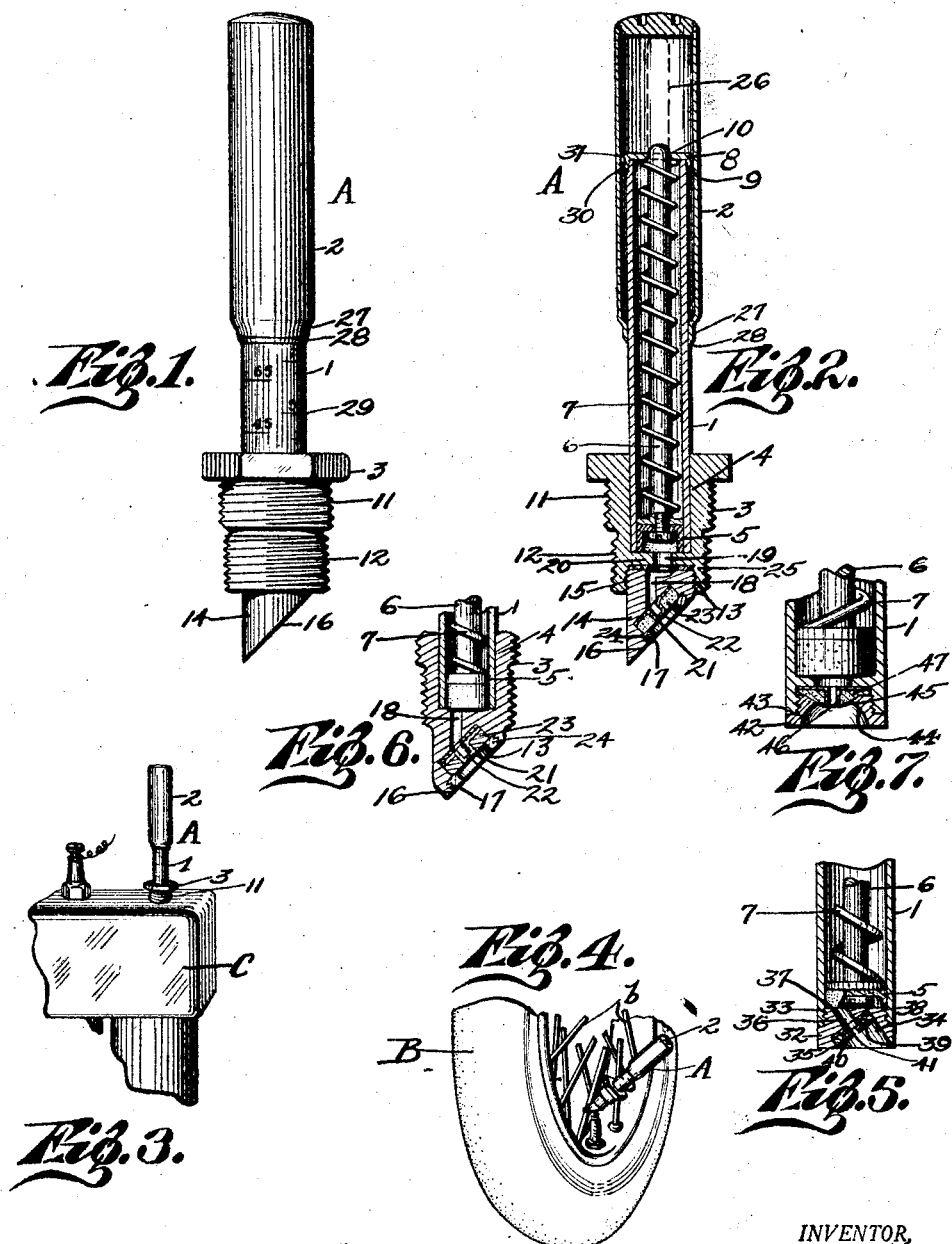
INVENTOR,
John J. Fitzgerald;
BY Raymond Ive Blakeslee,
ATTORNEYS.

Patented May 25, 1926.

1,585,844

UNITED STATES PATENT OFFICE.

JOHN J. FITZGERALD, OF LOS ANGELES, CALIFORNIA, ASSIGNOR TO A. SCHRADER'S SON, INCORPORATED, OF BROOKLYN, NEW YORK, A CORPORATION OF NEW YORK.

GAUGE DEVICE.

Application filed July 18, 1921. Serial No. 485,500.

This invention relates to pressure gauges, and particularly to a pressure gauge which incorporates many novel features of construction.

An object of the invention is to provide a gauge which may accurately measure fluid pressure in places difficult of access, as for instance measuring tire pressure where the valve member leading to the interior of the tire is encircled by spoke members of a wheel. Wire spoked wheels present a difficulty in the measuring of fluid pressure within a pneumatic tire carried by said wheel, as the valve extends upwardly between the spokes, and it is difficult to place a gauge device in a position so as to measure the pressure. This is particularly true of the hand gauge device.

The invention also contemplates a gauge device which may be utilized for measuring fluid pressure in internal combustion engines in addition to measuring fluid pressure in other mediums such as tires, and includes a construction adapted to enable the gauge to so measure the pressures.

This invention in certain aspects constitutes an improvement over my invention contained in Letters Patent Nos. 1,347,022 and 1,397,275 for gauge devices.

In practicing the invention I provide the terminal head or foot portion with a tire valve trip or unseating means arranged at an angle to the terminal head. Obviously when the valve trip means is applied to the valve stem of a pneumatic tire the angled position of the valve trip would cause the barrel member of the gauge to likewise be at an angle and as a consequence the indicating means of the gauge would not in any manner be interfered with.

The invention has for further objects the provision of an improved valve trip as well as an improved gauge which will be superior in point of relative simplicity and inexpensiveness, taken in conjunction with utility, durability and general efficiency and serviceabilty.

With the above mentioned and other objects in view, the invention consists in the novel and useful provision, formation, construction, combination, inter-relation of parts, members and features, as illustrated in some of its embodiments in the accompanying drawing, set forth in the following detailed description, and finally pointed out in claims.

In the drawing:

Figure 1 is a side elevation of a combination tire and cylinder compression gauge utilizing an improved terminal fitting for connection with a tire valve stem;

Figure 2 is a longitudinal sectional view through the gauge shown in Figure 1;

Figure 3 shows an adaptation of the improved gauge to a spark plug opening in an internal combustion engine;

Figure 4 shows the improved gauge in connection with a tire valve stem; and,

Figures 5, 6 and 7 are modifications of the terminal fitting, and particularly the tire valve trip means.

Corresponding parts in all the Figures are designated by the same reference characters.

Referring with particularity to the drawing, I have shown the improved device in cooperation with one form of gauge A, and of which gauge, 1 is the barrel and 2 an outer tubular shell, telescoping said barrel, and 3 a terminal head or foot portion associated with the barrel 1. The terminal head 3 is formed with a bore 4, adapted to receive the barrel 1. Within the barrel 1 is a plunger 5 having a stem 6 attached thereto. A coil spring 7 surrounds the stem 6 and has one of its ends projecting against the plunger and the other against an annular cap 8, which cap, as shown, has a screw-threaded engagement with an end 9 of the barrel and which cap 8 allows the stem to pass through an opening therein, as shown at 10. The terminal head is shown as having two threaded portions as 11 and 12, the portion occupied by the threads 11 being of greater diameter than the portion occupied by the threads 12. The terminal head is chambered or recessed as shown at 13 and a terminal head fitting 14 has a screw-threaded engagement with the side wall surrounding the bore or opening 13, as shown at 15 Fig. 2. The member 14 is formed with an inclined face 16 and a curved recess or chamber is formed in the member 14 and so extends that its side wall is practically at right angles to the inclined face 16, as shown at 17. A duct 18 extends from the chamber 17 directly upwardly and at an angle to the base of the chambered portion or bore 17. Said duct 18 communicates in turn with an opening or duct 19 in a partition 20 of the form shown in Fig. 2 within the terminal head, the opening or duct 19 leading to the interior of the barrel 1. Within the bore or chamber or opening 17 is confined an anvil or tire valve unseating means 21, said anvil being provided with a duct 22. An annular washer or press-on seat 23 is carried on the anvil plate and surrounds the anvil proper. A threaded bushing 24 has a screw-threaded engagement with a portion of the wall surrounding the bore 17, and is adapted to hold the washer and anvil in position within the bore or chamber 17. In Figure 2 I have also shown a washer 25 as interposed between the surface of the member 20 and the inner surface of the member 14.

Referring to Figure 4, it will be noted that in order to test the pressure within a tire the tire gauge A must incline at an angle so that the valve trip may engage the anvil and the valve cage itself be pressed against the washer 23 to prevent loss of air. Air will then pass through the duct 22 into the duct 18 and thence impinge against the plunger 5 forcing the plunger upwardly and in so doing compressing the spring 7. Obviously, as the barrel cannot move, the stem will be raised as indicated by dotted lines at 26 and raise the tubular shell 2. Upon removing the gauge from the trip the tubular shell will remain in position while the stem 6 will return to normal position, inasmuch as it is at all times urged downwardly through the medium of the coil spring 7. In order to prevent the tubular shell from likewise returning to normal position I contract a portion, as 27 of said tubular shell and likewise bevel an edge thereof, as 28. The contracted portion 27 tightly engages the outer surfaces of the barrel 1 and the beveled edge portion 28 is adapted to pass over graduations, as 29, upon the barrel 1. The beveled edge acts as a marker for indicating pressures. I likewise provide the cap 8 with an annular recess 30, and within said recess I place a split spring ring 31. This spring ring 31 bears against the inner surface of the tubular shell 2, and frictionally engages said surface so as to aid in preventing accidental movement of the tubular shell with relation to the barrel 1. After the pressure has been measured the tubular shell may be returned to its normal position indicating no pressures whatever, by simply pressing upon the top thereof, so that it may telescope the barrel 1.

The invention primarily, however, does not reside in any detail construction of gauge, nor in a particular terminal head as illustrated in Figures 1 and 2, the invention in its aspects more or less relating to the member 14 which so adapts the gauge that it will readily act in connection with the tire valve cage or stem of a pneumatic tire where the tire valve stem is difficult of access, due to various causes, such as proximity of spokes, disc wheel construction, etc.

Referring to Figure 4 I have illustrated a fragmentary perspective view of a wheel member B provided with wire spokes b. It is to be noted that my gauge A may readily be utilized with such wheel construction and the indicating member or tubular shell 2 will not in its movement be interfered with.

Figure 3 simply shows an adaptation of the gauge shown in Figure 1, the said gauge being applied to the spark plug opening of an internal combustion engine C, the terminal head being so arranged as to permit an insertion of the gauge within the spark plug opening and so that the gauge may indicate the compression within any given cylinder.

In Figures 5, 6 and 7, I have indicated a modification of the particular arrangement of the tire valve trip means.

In Figure 6 the member is formed integrally with the terminal head 11 in place of the detachable connection shown in Figure 2.

In Figure 5 I have illustrated a gauge construction which does not have a terminal head 11, and which gauge is adapted only to measure pressures within pneumatic tires on similar devices having a valve stem. In said construction shown in Figure 5 I provide a shoulder member 32 having a screw-threaded engagement as at 33, with the barrel 1. The member 32 is provided with a bore 34 opening outwardly and at an angle to the bottom face 35 of the member 32. A duct 36 in turn communicates with the chamber 34 and with an opposite face 37. This duct 36 in the construction shown in Figure 5 allows communication of air to the interior of the barrel 1. Included within the chamber or bore 34 is an anvil plate 38 with a washer 39 carried upon said anvil plate, and an annular ring 40 for retaining the washer 39 and anvil and anvil plate in position within the chamber. A duct 41 extends through the annular ring. Obviously this construction will act the same as the construction shown in Figures 1, 2 and 6, the only difference being that in place of having an inclined face 16 the face is transverse or at right angles to the outer surface of the barrel 1.

In Figure 7 I have provided a structure in which a member 42 has a detachable engagement with the barrel 1. Said member 42 is shouldered as at 43, and a portion thereof is screw-threaded within the barrel 1. The member 42 is given a spherical bore as shown at 44. A medium portion of said member 42 is provided with an opening 45 extending therethrough, and surrounding said opening and within the chamber formed by the bore 44 is an anvil and an anvil plate 46. A washer member 47 presenting a convex surface, as shown, surrounds said anvil plate and anvil, and is adapted to hold the anvil plate within the chamber 44. As before mentioned, the anvil is provided with a duct allowing communication with the interior of the barrel 1. It is obvious that the structure shown in Figure 7 accomplishes a result identical with that accomplished by the construction shown in the other figures of the drawing, and will permit the gauge to be held in an angle to the tire valve trip and cage and yet provide a structure which will prevent the escape of air and accurately measure fluid pressure.

It is obvious that many changes and variations may be made in departure from the disclosure herein, without departing from the true spirit and scope of the invention, and a fair interpretation of the claims.

Having thus disclosed my invention, I claim and desire to secure by Letters Patent:

1. A pressure gauge for pneumatic tires or the like comprising a straight foot portion having a press-on seat therein disposed in inclined relation to the longitudinal axis of the foot portion.

2. A pressure gauge for pneumatic tires or the like comprising a straight foot portion having a press-on seat therein, the exposed face of said press-on seat being inclined to the longitudinal axis of the foot portion.

3. A pressure gauge for pneumatic tires or the like comprising a tubular member and a straight foot portion at the lower end thereof in axial alinement therewith, and a press-on seat disposed in said foot portion in inclined relation to the axis thereof.

In testimony whereof, I have signed my name.

JOHN J. FITZGERALD.